UNITED STATES PATENT OFFICE.

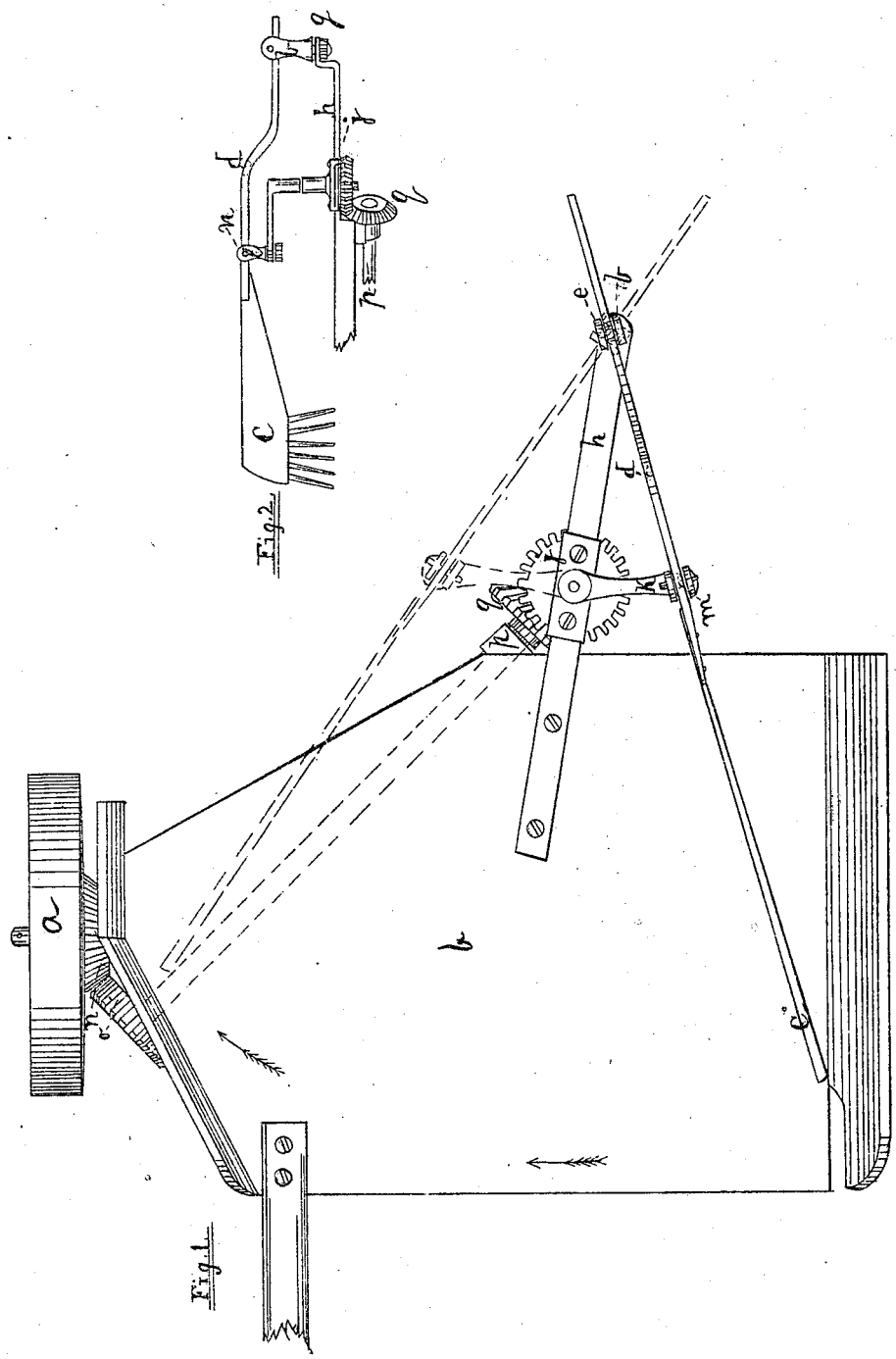

THOMAS TAYLOR, OF BALTIMORE, MARYLAND, ASSIGNOR TO SAMUEL C. RIDGAWAY AND JOHN FOX.

IMPROVEMENT IN HARVESTER-RAKES.

Specification forming part of Letters Patent No. 53,929, dated April 10, 1866.

*To all whom it may concern:*

Be it known that I, THOMAS TAYLOR, of the city of Baltimore, in the State of Maryland, have invented a certain new and useful Improvement on Raker Attachments to Harvesters; and I do hereby declare that the following is a full, clear, and exact description of the construction and operation of the same, reference being had to the accompanying drawings, and to the letters and marks thereon.

Figure 1 of these drawings represents so much of a harvester as is necessary to show my invention, with my raker attachment affixed thereto, the view being had by looking down upon the machine, while Fig. 2 is a lateral view of the raker, a part of the gearing, and the means for giving it motion.

In each of these figures, where like parts are shown, like marks and letters are used to indicate the parts.

The main or driving wheel is marked $a$, the platform $b$, and the raker $c$, which, it will be noticed, has an arm, $d$, curved and prolonged, and its rear end passing between the two plates $e$ and $f$ of a swiveled upright, which has a bearing, $g$, in the end of the bar $h$, extending back from the platform, to which it is secured. The bar $h$ also gives a support or bearing for the crank-shaft $i$, the shaft passing down through the support or bearing, as is shown by Fig. 2, and having attached to its lower end a beveled wheel, $j$.

The arm $k$ of the crank-shaft supports a swiveled and divided upright, $l$, which affords a vibrating joint, $m$, to the arm of the raker.

A beveled wheel, $n$, is attached to the main or driving wheel, that gives motion to wheel $o$ on shaft $p$, wheel $q$ on shaft $p$ communicating that motion to the crank-shaft through beveled-wheel $j$. The motions and operation of the raker will therefore readily be perceived.

The machine being in motion and the crank-shaft rotated, as described, will carry with it the raker, whose movements will be directed and controlled by the movements of the curved portion of the arm in the swiveled guide on the rear of the bar $h$, so that the raker will be raised and lowered at the proper points and time, and made to traverse forward and backward over the platform or bed, carrying off the cut grain at each of the movements.

The position of the raker at the commencement of its action is shown by the black marks and lines in Fig. 1, and its terminating position by the red lines in the same figure.

What I claim as my invention, and desire to secure by Letters Patent, is—

The combined action of the crank-shaft and curved arm of the raker, moving in the swiveled guide, for giving motion to and operating the raker, as herein recited.

This specification signed this 16th day of January, 1866.

THOS. TAYLOR.

Witnesses:
PHILIP T. TILYARD,
W. H. HAYWOOD.